(12) United States Patent
Gross

(10) Patent No.: US 7,665,425 B2
(45) Date of Patent: Feb. 23, 2010

(54) EXERCISE/CONDITIONING BODYSUIT FOR ANIMALS

(76) Inventor: Schon A. Gross, 2104 Thomas View Rd., Reston, VA (US) 20191

( * ) Notice: Subject to any disclaimer, the term of this patent is extended or adjusted under 35 U.S.C. 154(b) by 150 days.

(21) Appl. No.: 11/976,111

(22) Filed: Oct. 22, 2007

(65) Prior Publication Data

US 2008/0149045 A1 Jun. 26, 2008

Related U.S. Application Data

(60) Provisional application No. 60/853,030, filed on Oct. 20, 2006.

(51) Int. Cl.
*A01K 29/00* (2006.01)
(52) U.S. Cl. ........................ 119/850; 119/728
(58) Field of Classification Search .................. 119/850, 119/725, 728, 770, 792, 793, 907, 858, 859
See application file for complete search history.

(56) References Cited

U.S. PATENT DOCUMENTS

| | | | |
|---|---|---|---|
| 4,530,309 A * | 7/1985 | Collins | 119/863 |
| 4,644,902 A * | 2/1987 | Doyle | 119/497 |
| D290,178 S * | 6/1987 | Nissen | D30/109 |
| 5,148,956 A * | 9/1992 | Funk | 224/576 |
| 5,193,486 A * | 3/1993 | Kitchens | 119/725 |
| 5,369,804 A * | 12/1994 | Metcalf | 2/69 |
| 5,738,043 A * | 4/1998 | Manuel | 119/497 |
| 5,894,817 A * | 4/1999 | Manuel | 119/497 |
| 6,123,049 A * | 9/2000 | Slater | 119/850 |
| D453,594 S * | 2/2002 | Ishihara | D30/152 |
| 6,431,123 B1 * | 8/2002 | Hibbert | 119/850 |
| 6,595,162 B1 * | 7/2003 | Hibbert | 119/850 |
| 6,631,697 B1 * | 10/2003 | Solze | 119/728 |
| 6,640,751 B1 * | 11/2003 | Cool | 119/727 |
| 6,802,282 B2 * | 10/2004 | Muckleroy | 119/497 |
| 6,928,960 B2 * | 8/2005 | Carlos et al. | 119/853 |
| D510,160 S * | 9/2005 | Rominger | D30/199 |
| 7,325,516 B2 * | 2/2008 | Moore | 119/850 |
| 2003/0200937 A1 * | 10/2003 | Muckleroy | 119/497 |
| 2005/0229869 A1 * | 10/2005 | Leo | 119/850 |
| 2005/0263102 A1 * | 12/2005 | Sherman et al. | 119/792 |
| 2008/0110414 A1 * | 5/2008 | Buehner | 119/712 |

* cited by examiner

*Primary Examiner*—Yvonne R. Abbott
(74) *Attorney, Agent, or Firm*—Hoffman, Wasson & Gitler, P.C.

(57) ABSTRACT

A vest surrounds the animal's torso. Slings for supporting the front or rear legs can be attached to the vest. Besides straps with rings, the vest may have monitors for remote monitoring of the animal's vital signs.

6 Claims, 2 Drawing Sheets

EXERCISE/CONDITIONING BODYSUIT FOR ANIMALS

This application claims benefit of provisional application 60/853,030, filed on Oct. 20, 2006 and incorporated herein by reference.

BACKGROUND OF THE INVENTION

Veterinary care often includes the long term rehabilitation of an injured animal. Any rehabilitation device for animals must be designed with the idea that the animal will not cooperate with any rehabilitation regimen. The device also needs minimal human intervention, light weight, be easy for the person to apply to the animal and allows rehabilitation on a continuous basis while being used by the animal.

SUMMARY OF THE INVENTION

A vest surrounds the animal's torso Slings for supporting the front or rear legs can be attached to the vest. The vest may have monitors for remote monitoring of the animal's vital signs.

DETAILED DESCRIPTION OF THE INVENTION

Figure 1:
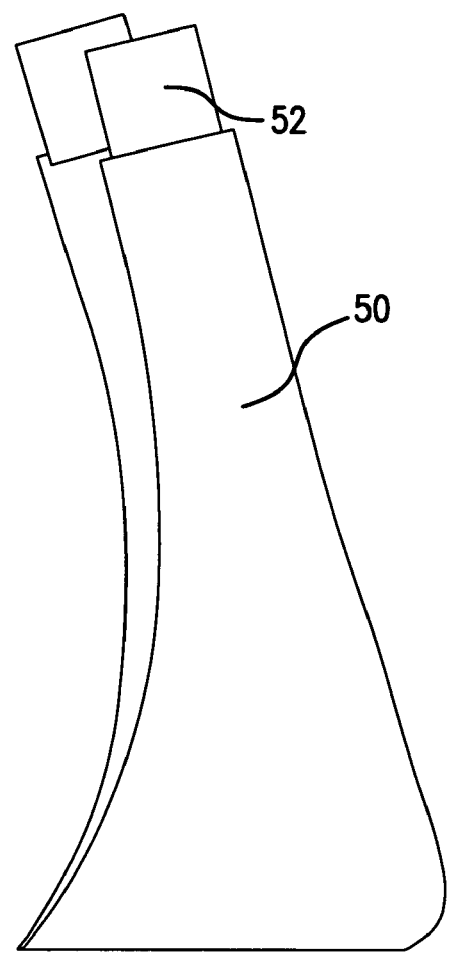
FIG. 1 is a perspective view of a sling
Figure 2:
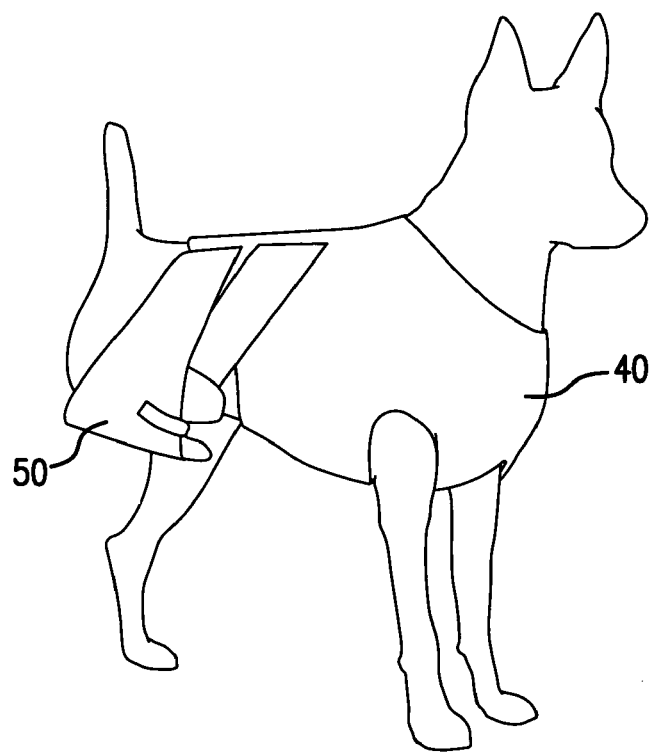
FIG. 2 is a side view of the vest and sling on an animal.

A sling 50 made of any suitable material, such as the hook compatible BreathOprene™ material is seen in FIG. 1. Two tabs 52 having fasteners, such as hook material, extend from the edges of the sling. FIG. 2 shows the sling attached to the vest and functioning to hold the right leg in flexion.

Figure 3:
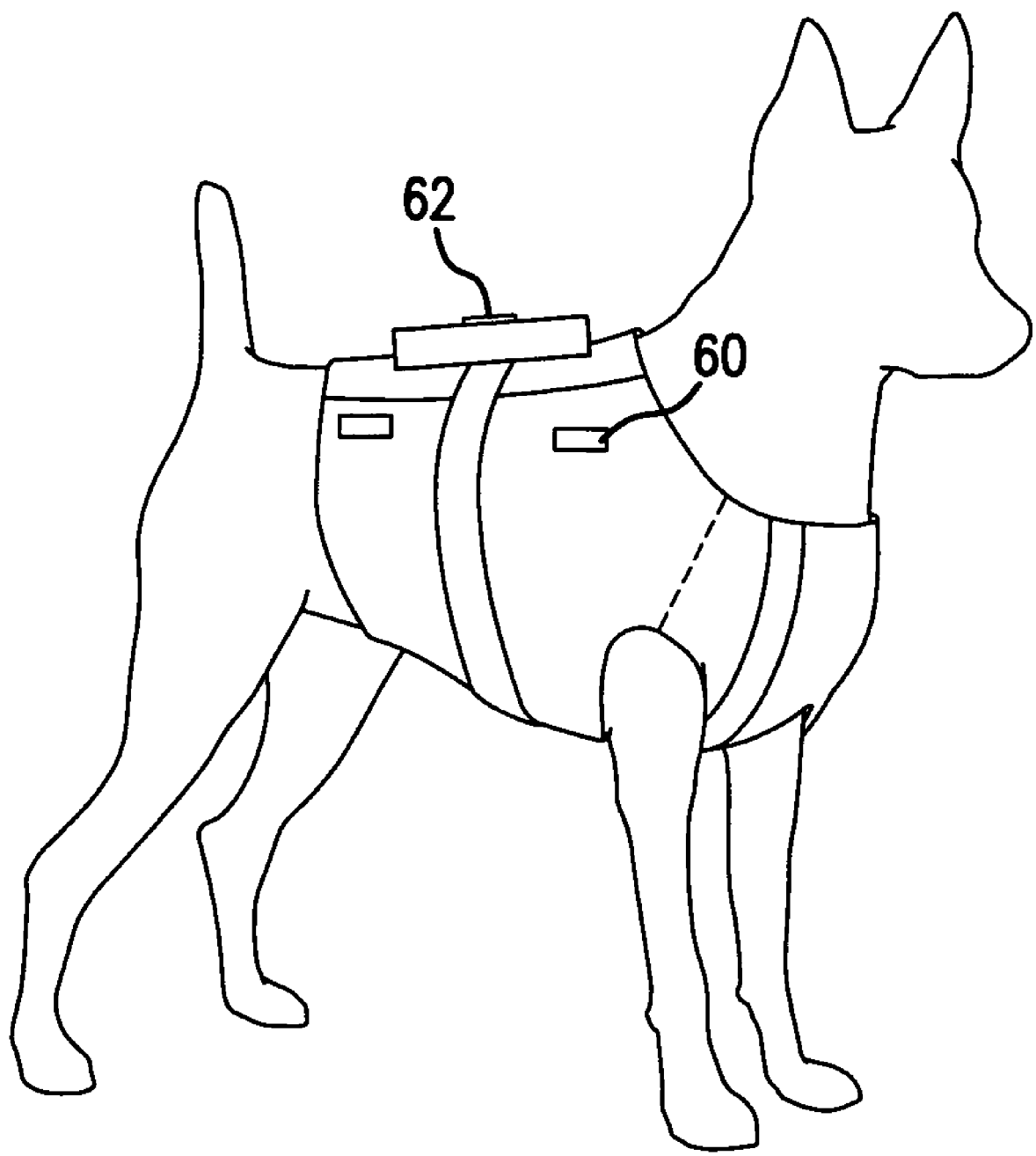
FIG. 3 is a view of an animal wearing a vest having telemetry.

The vest can also be used with telemetry to allow the remote monitoring of an animals vital signs, as seen in FIG. 3. The vest may or may not have the straps on the exterior. An opening 60 in the vest allows for the passage of wires from at least one sensor on the interior on the suit to the transmitter 62 on the exterior. The sensor may be for any condition of the animal, such as heart rate, respiratory rate or temperature. Of course, several conditions can be monitored simultaneously. While the transmitter may be on the interior, the animal's comfort is increased when on the exterior. The sensor readings can also be recorded for later analysis rather than being transmitted.

While the invention has been disclosed with reference to preferred embodiments, modifications and variations would be apparent to one of ordinary skill in the art. The invention encompasses such variations and modifications.

I claim:

1. A vest for an animal comprising
a central portion having two sides, a front edge and a rear edge,
two apertures proximate the front edge for the front legs of an animal,
a side portion extending from each side of the central portion,
mating connectors on the side portions allowing the side portions to be connected to one another, and
a separate sling having two ends and a fastener tab at each end, each fastener tab attached to a same side portion and opening in the vest thereby engaging a leg of the animal for immobilization thereof.

2. The vest of claim 1, further comprising a sensor on the vest.

3. The vest of claim 1, wherein the fastener tab at each end is releasably attached and the separate sling is U-shaped.

4. A vest for an animal comprising
a central portion having two sides, a front edge and a rear edge,
two apertures proximate the front edge for the front legs of an animal,
a side portion extending from each side of the central portion,
mating connectors on the side portions allowing the side portions to be connected to one another, and
sensors on the inside of the vest and in direct contact with the animal's body monitoring at least one condition of an animal.

5. The vest of claim 4, further comprising
a transmitter connected to the at least one sensor.

6. The vest of claim 4, wherein the sensor monitors the animal's heart rate, respiratory rate or temperature.

* * * * *